US010167743B2

United States Patent
Olia

(10) Patent No.: US 10,167,743 B2
(45) Date of Patent: Jan. 1, 2019

(54) METHOD FOR CONTROLLING A STEAM GENERATOR AND CONTROL CIRCUIT FOR A STEAM GENERATOR

(75) Inventor: Hamid Olia, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1492 days.

(21) Appl. No.: 12/869,069

(22) Filed: Aug. 26, 2010

(65) Prior Publication Data

US 2011/0023487 A1 Feb. 3, 2011

Related U.S. Application Data

(63) Continuation of application No. PCT/EP2009/052279, filed on Feb. 26, 2009.

(30) Foreign Application Priority Data

Feb. 26, 2008 (CH) .......................................... 279/08

(51) Int. Cl.
*F01K 7/42* (2006.01)
*F01K 23/10* (2006.01)
(Continued)

(52) U.S. Cl.
CPC ............ *F01K 23/10* (2013.01); *F22B 35/007* (2013.01); *F22B 35/102* (2013.01); *Y02E 20/16* (2013.01)

(58) Field of Classification Search
USPC ................ 122/1 A; 60/653, 667; 700/28–33, 700/41–43, 209
See application file for complete search history.

(56) References Cited

U.S. PATENT DOCUMENTS 3,205,869 A * 9/1965 Pescatore .................. 122/451 S
3,260,246 A * 7/1966 Zwetz ..................... F22B 29/10
                                              122/451 S (Continued)

FOREIGN PATENT DOCUMENTS

EP         0425717 A1     5/1991
EP         1431523 A1     6/2004
(Continued)

OTHER PUBLICATIONS

"compressed fluid"—wikipedia the free encyclopedia, Oct. 3, 2008.*
EP2065641A2—Machine Translation.*

*Primary Examiner* — Nathaniel Herzfeld
(74) *Attorney, Agent, or Firm* — GE Global Patent Operation; Marc A. Vivenzio

(57) ABSTRACT

In a method for controlling a waste heat recovery steam generator of the once-through steam generator type in a combined cycle power plant, the flow volume of the feedwater into the steam generator is controlled based on a measured steam temperature at the outlet of a superheater and on a set-point value for the steam temperature for a steam turbine. A degree of superheating at the outlet of a high-pressure evaporator, a degree of subcooling at the inlet into the high-pressure evaporator, and the measured current flow volume of the feedwater are integrated in the control system in a plurality of control steps. For an optimum operation during rapid load changes, the method especially comprises additional controlling of the degree of subcooling of the flow medium at the inlet into the high-pressure evaporator.

6 Claims, 2 Drawing Sheets

(51) Int. Cl.
  *F22B 35/00* (2006.01)
  *F22B 35/10* (2006.01)

(56) References Cited

U.S. PATENT DOCUMENTS

| | | | | |
|---|---|---|---|---|
| 3,837,167 | A * | 9/1974 | Durrant et al. | 60/664 |
| 4,241,701 | A * | 12/1980 | Morse | 122/460 |
| 5,159,897 | A * | 11/1992 | Franke et al. | 122/367.3 |
| 5,293,842 | A * | 3/1994 | Loesel | 122/7 R |
| 6,460,490 | B1 * | 10/2002 | Knauss | F22B 1/1815 |
| | | | | 122/1 C |
| 7,028,480 | B2 * | 4/2006 | Sekiai et al. | 60/646 |
| 7,668,623 | B2 * | 2/2010 | Kephart | G05D 23/19 |
| | | | | 700/275 |
| 2008/0029261 | A1 * | 2/2008 | Kephart | G05D 23/19 |
| | | | | 165/293 |
| 2008/0302102 | A1 * | 12/2008 | Cheng et al. | 60/653 |
| 2010/0288210 | A1 * | 11/2010 | Bruckner et al. | 122/451.1 |

FOREIGN PATENT DOCUMENTS

| | | |
|---|---|---|
| EP | 2065641 A2 * | 6/2009 |
| GB | 2099558 A | 12/1982 |
| WO | 2006107315 A1 | 10/2006 |
| WO | 02101292 A2 | 8/2010 |

\* cited by examiner

METHOD FOR CONTROLLING A STEAM GENERATOR AND CONTROL CIRCUIT FOR A STEAM GENERATOR

CROSS REFERENCE TO RELATED APPLICATIONS

This application is a continuation of International Application No. PCT/EP2009/052279 filed Feb. 26, 2009, which claims priority to Swiss Patent Application No. 00279/08, filed Feb. 26, 2008 the entire contents of all of which are incorporated by reference as if fully set forth.

FIELD OF INVENTION

The invention refers to a method for controlling a waste heat recovery steam generator of a once-through evaporator type, especially in use in a combined cycle power plant, and also to a control circuit for controlling a heat recovery steam generator of the said type.

BACKGROUND

Combined cycle power plants comprise a gas turbine, a steam turbine and also an exhaust gas steam generator, in which feedwater is evaporated and superheated by means of heat exchange with hot exhaust gas from the gas turbine and in counterflow to the hot exhaust gas, and is then fed to the steam turbine as live steam. One type of these steam generators, frequently also referred to as "heat recovery steam generator" or HRSG, are steam generators, also known as once-through steam generators or "once-through evaporators." They differ from so-called circulation steam generators by the water which is to be evaporated flowing basically only once through the steam generator.

Such once-through steam generators, especially horizontal once-through steam generators, are disclosed for example in WO2006/107315. Once-through steam generators are especially wherein the temperature of the exhaust gas from the gas turbine continuously decreases from the inlet to the outlet of the steam generator and the heat in each tube row, over which the exhaust gas flows, is proportional to the temperature difference between the exhaust gas and the fluid in the heat exchanger tubes. As a result, a continuously decreasing heat flux is created in the direction of the exhaust gas flow. WO2006/107315 discloses a specific type of construction of the tube bundle and discusses collectors, wherein these would especially withstand the material loads as a result of frequent starting and shutting down of the power plant.

WO2002/101292 discloses a further steam generator of the once-through evaporator type, in which for the purpose of increased mechanical stability and thermal stressability the once-through heating surfaces have vertically arranged downpipe sections and riser pipe sections.

SUMMARY

A method for controlling a steam generator of a once-through steam generator type (2), which is integrated in a combined cycle power plant with a steam turbine (DT) and a gas turbine (GT), wherein the steam generator (2) comprises: an HP economizer (5), an HP evaporator (4), and at least one superheater (3), wherein opening of a valve (12) for regulating the flow volume in a feedwater supply line (14) into the high-pressure evaporator (4) is controlled in dependence upon a temperature set-point value for the steam for the steam turbine (DT) and also upon a measured steam temperature at the outlet of the at least one superheater (3) and by means of a plurality of control steps (PID1-4) in series, wherein the measured steam temperature at the outlet of the superheater (3), a degree of superheating at the outlet of the high-pressure evaporator (4) and a degree of subcooling of the feedwater at the inlet into the high-pressure evaporator (4) are integrated in the control steps (PID1-4).

BRIEF DESCRIPTION OF THE DRAWINGS

The invention will be explained in more detail in the following text with reference to exemplary embodiments and in conjunction with the drawing. All of the elements which are not required for immediate understanding of the invention have been omitted. Identical elements are provided with the same reference symbols in the various figures. The flow direction of the media is indicated by arrows. In the figures.

DETAILED DESCRIPTION OF THE PREFERRED EMBODIMENTS

Introduction to the Embodiments

Figure 1:
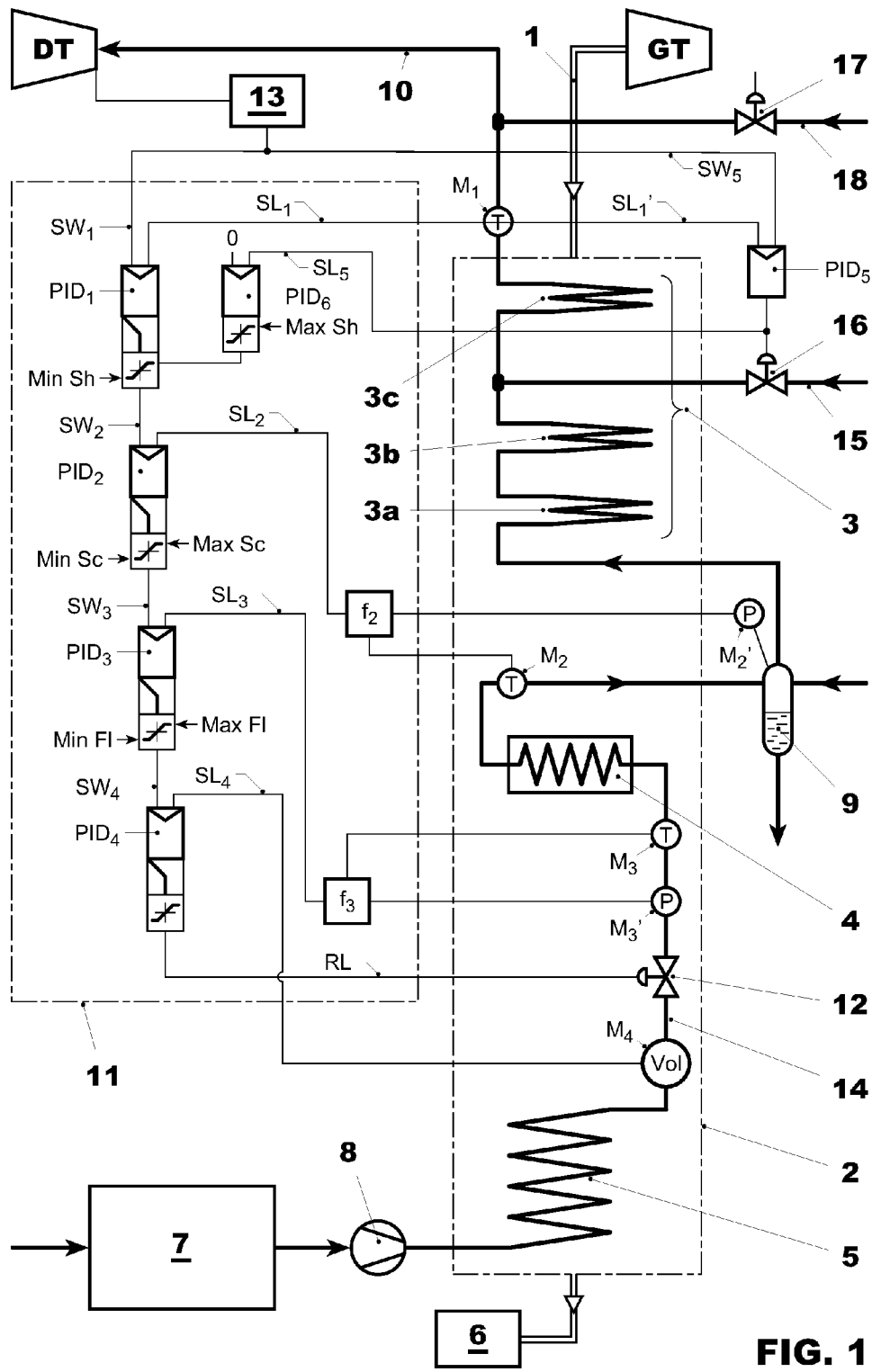
FIG. 1 shows a schematic representation of an exhaust gas steam generator.

The present disclosure provides a method for controlling a once-through evaporator, which is used in an exhaust gas steam generator of a combined cycle power plant with a gas turbine and a steam turbine. In particular, the controlling method ensures achieving a steam temperature according to each operating state of the steam turbine and gas turbine. A further feature is the provision of a control circuit for controlling a once-through steam generator, which is integrated in a combined cycle power plant.

According to an embodiment for controlling a once-through evaporator in a combined cycle power plant, which has a high-pressure economizer or feedwater preheater, a high-pressure evaporator and at least one superheater, a valve opening for regulating the flow volume in a feedwater supply line into the high-pressure evaporator is controlled in dependence upon a temperature set-point value for the steam for the steam turbine and also upon a measured steam temperature at the outlet of the superheater in series. The method is carried out by means of a plurality of control steps, wherein the measured steam temperature at the outlet of the superheater, a degree of superheating at the outlet of the high-pressure evaporator and a degree of subcooling of the feedwater at the inlet into the high-pressure evaporator are incorporated in the control steps.

The method is suitable for all operating states of the combined cycle power plant, i.e. both for during the running up and shutting down and the station operation of the plant.

It especially ensures optimum superheating of the steam at the outlet of the high-pressure evaporator which is predetermined for all operating states of the combined cycle power plant. Moreover, it ensures adequate subcooling of the feedwater at the inlet of the high-pressure evaporator for an optimum operation of the high-pressure evaporator and also for a minimum flow of the feedwater into the high-pressure evaporator.

A once-through evaporator can have different arrangements of tube bundles which differ for example in the number of parallel-arranged tubes or in the number of series-arranged tube bundles or in the type of construction and arrangement of the individual heat exchange tubes. The control method according to the embodiments is suitable for each type of once-through evaporators, regardless of the arrangement of the tube bundle.

The method for controlling a once-through evaporator in a combined cycle power plant, which has a high-pressure economizer, a high-pressure evaporator and at least one superheater, comprises the following steps in an embodiment of the method:

measuring the steam temperature at the outlet of the superheater, in a first control step, comparing the steam temperature with a set-point value for the turbine steam temperature according to an operating state of the steam turbine, determining a set-point value for the degree of superheating at the outlet of the high-pressure evaporator, based on the difference between the measured value and set-point value of the steam temperature at the outlet of the superheater, measuring the current degree of superheating at the outlet of the high-pressure evaporator, in a second control step, determining a set-point value for the degree of subcooling of the water at the inlet to the high-pressure evaporator, based on the difference between the set-point value and current measured value of the degree of superheating at the outlet of the high-pressure evaporator, measuring the current degree of subcooling of the feedwater at the inlet into the high-pressure evaporator, in a third control step, determining a set-point value for the flow volume for the feedwater at the inlet into the high-pressure evaporator, based on the difference between the set-point value for the degree of subcooling and the current measured degree of subcooling, based on the set-point value for the flow volume of the feedwater, generating and transmitting a control signal for the opening of a valve in the feedwater supply line.

In another embodiment, additionally carrying out the following steps after determining a set-point value for the flow volume of the feedwater:

measuring the current flow volume of the feedwater into the high-pressure evaporator, in a fourth control step, determining a valve opening position in a feedwater supply line upstream of the inlet into the high-pressure evaporator, based on the difference between the set-point value for the flow volume of the feedwater and the current measured flow volume, transmitting a control signal for the opening of the valve in the feedwater supply line.

In these embodiments, the third control step ensures that during normal operation and also during slow load changes of the combined cycle power plant and of the once-through evaporator, the flow medium at the inlet of the high-pressure evaporator is sufficiently subcooled. In particular, subcooling controlling by means of the third control step ensures that evaporation at the inlet of the evaporator tubes of the high-pressure evaporator is avoided. Such an evaporation would otherwise give rise to a low mass flow through these evaporator tubes which would lead to overheating of the tubes and to an unstable flow through the entire evaporator with corresponding risk of damage. The third control step therefore ensures a stable flow through the evaporator and consequently a reliable operation with reduced risk of damage.

During rapid load changes of the combined cycle power plant and of the once-through evaporator, and especially with rapid unloading of the plant, a new problem arises, however. In such operating situations, the pressure inside the evaporator drops and therefore also the saturation temperature to a level below the temperature of the flow medium at the outlet of the feedwater preheater (or high-pressure economizer). In such a non-steady operating state, the subcooling of the flow medium at the inlet of the high-pressure evaporator by means of the subcooling controller in the third control step can no longer be ensured.

Only after expiry of such an operating state does the temperature of the flow medium at the outlet of the feedwater preheater (high-pressure economizer) establish itself again at a level below the saturation temperature, whereby the subcooling controlling of the third control step can become effective again.

During operation of the once-through evaporator, the temperature of the flow medium at the outlet of the feedwater preheater should not lie below the specified set-point value for a considerable time because otherwise the subcooling controlling would then lead to an overfeeding of the high-pressure evaporator and therefore to a reduction of steam production.

For these special operating situations which are mentioned, especially during rapid unloading of the plant, and the problems associated therewith, a further embodiment offers a remedy. In this embodiment, in addition to the subcooling controlling of the high-pressure evaporator by means of the third control step, the subcooling of the flow medium at the inlet into the high-pressure evaporator is controlled with a set-point value slightly below the minimum set-point value of the third control step. For this purpose, opening of a valve in a bypass line for the feedwater is controlled by the feedwater preheater, wherein the bypass line leads from the feedwater pump outlet to the feedwater line downstream of the economizer and upstream of the inlet of the high-pressure evaporator. The method includes the additional method step:

determining a set-point flow volume through a bypass line between the outlet of the feedwater pump of the combined cycle power plant and the inlet of the high-pressure evaporator, based on the difference between the current measured value of the degree of subcooling at the inlet of the high-pressure evaporator and a minimum set-point value for the subcooling which is less than the minimum set-point value for the subcooling in the third control step;

based on the set-point value for the flow volume through the bypass line, generating and transmitting a control signal for the position of a valve in the bypass line.

In a further embodiment, the method includes the additional method step:

determining the current flow volume in the bypass line;

generating a control signal for the opening position of a valve in the bypass line, based on the set-point flow volume and a current flow volume through the bypass line;

transmitting a control signal for the position of the valve in the bypass line.

A control circuit for controlling a once-through steam generator in a combined cycle power plant with a gas turbine and a steam turbine, wherein the once-through steam generator has a high-pressure economizer, a high-pressure evaporator and at least one superheater, has the following elements:

- a device for the input of a set-point value for a desired turbine steam temperature and also a measuring device for measuring the steam temperature at the outlet of a steam superheater of the steam generator,
- a device for measuring and calculating the degree of steam superheating at the outlet of the high-pressure evaporator of the steam generator,
- a device for measuring and calculating the degree of subcooling at the inlet into the high-pressure evaporator,
- at least three control modules which are connected in series,
- signal lines for transmitting to the control modules the measured values of the steam temperature at the outlet of the at least one superheater, the values of the degree of steam superheating at the outlet from the high-pressure evaporator, and the values of the degree of subcooling of the feedwater at the inlet into the high-pressure evaporator,
- a control signal line for transmitting a control signal from the last series-connected control module to a valve in the supply line for the feedwater into the high-pressure evaporator.

A further embodiment of the control circuit additionally comprises:

- a measuring device for measuring the flow volume of the feedwater into the high-pressure evaporator,
- an additional, fourth control module which is connected in series to the three control modules and from which the control signal line leads to the valve in the feedwater supply line.

The control circuit embodiments and also the method, ensure that a minimum volume for the feedwater reaches the high-pressure evaporator and the high-pressure evaporator can function in a stable manner with minimum risk of thermally induced material damage. Moreover, it also ensures a reliable function of the high-pressure evaporator in the event of valve malfunction.

A further embodiment of the control circuit, for the purpose of realizing the method according to the method, additionally comprises,

- an additional control module for determining a set-point flow volume through a bypass line between a feedwater pump of the combined cycle power plant and the inlet into the high-pressure evaporator of the once-through evaporator;
- a signal line for transmitting to the additional control module the current measured degree of subcooling at the inlet to the high-pressure evaporator;
- a signal line for transmitting a valve control signal to the valve in the bypass line.

A further embodiment of the control circuit, in addition to the last embodiment, has

- a further control module which is connected in series to the control module for determining the set-point flow volume through the bypass line;
- a signal line for transmitting to this further control module the set-point value for the flow volume through the bypass line;
- a signal line for transmitting to this further control module a current value for the flow volume.

For the control modules for generating the set-point values, for example proportional-integrator-differentiator control modules, also referred to as PID modules for short, are used. Other modules, such as state controllers with monitors, can similarly be used for the specified function.

DETAILED DESCRIPTION

FIG. 1 schematically shows the elements of a gas-steam combined cycle power plant including a gas turbine GT from which hot exhaust gases are fed via an exhaust gas line 1 into an exhaust gas steam generator 2. The steam generator comprises a once-through steam generator with a plurality of high-pressure superheaters 3, a high-pressure (HP) evaporator 4, and one or more high-pressure (HP) economizers 5, (wherein these elements are named in sequence of the exhaust gas flow). From the steam generator 2, a duct leads to a smoke stack 6 for the purpose of discharging the exhaust gas. On the feedwater side, a feedwater tank 7 is shown, from which feedwater for heating is fed to the HP economizer 5 via a feedwater pump 8. After discharging from the HP economizer 5, the feedwater is fed to the HP evaporator 4 in which it is evaporated. A steam line leads from the HP evaporator 4 first into a separator 9 in which water is separated out, especially during a start-up phase of the plant. From the separator 9, the steam line finally leads into the first of a plurality of stages 3a, 3b, 3c of the high-pressure superheater 3. After discharging from the last stage 3c, the superheated steam is fed to a steam turbine DT via a live steam line 10.

The steam generator 2 is shown schematically vertical in the figure. The method according to the embodiments is suitable for once-through steam generators, through which the exhaust gas from the gas turbine flows essentially in the horizontal or in the vertical direction.

A control circuit 11 for controlling a steam generator 2 has a temperature measuring device $M_1$ for measuring the steam temperature at the outlet of the steam superheater 3, and also a device 13 for the automatic or manual input of a set-point value for the steam temperature in the turbine DT which is required for a given steam turbine operation. The temperature value from the measuring device $M_1$ and the set-point value for the turbine steam temperature are fed via signal lines $SL_1$ or $SW_1$ to a proportional-integrator-differentiator control module (PID module) $PID_1$. Based on the difference between the set-point value for the steam temperature for the steam turbine and the measured value of the steam temperature at the outlet of the steam superheater 3, the $PID_1$ determines a set-point value for the degree of superheating of the steam at the outlet from the HP evaporator 4, which is fed via a signal line $SW_2$ to a second PID module $PID_2$.

At the outlet of the HP evaporator 4, a device for measuring and calculating the degree of superheating is arranged, wherein this comprises a temperature measuring device $M_2$, a pressure measuring device at the separator 9 and an arithmetic function module. The measured values are fed to the arithmetic function module $f_2$ for calculating the current degree of superheating in consideration of the prevailing saturation temperature. The calculated degree of superheating from the module $f_2$ is fed via a signal line $SL_2$ to the $PID_2$ which, based on the difference between the current degree of superheating and the set-point value for the degree of superheating, generates a further set-point value for the degree of subcooling of the feedwater at the inlet to the HP evaporator 4. This subcooling set-point value is fed via line $SW_3$ to a third PID module $PID_3$. For establishing the degree of subcooling of the feedwater, a device for measuring and calculating the degree of subcooling is arranged in the supply line 14 to the HP evaporator 4, comprising a measuring device $M_3$ for measuring the temperature of the feedwater, a pressure measuring device $M_3'$, and an arithmetic function module $f_3$.

The measured values from the devices $M_3$ and $M_3'$ are again fed to the arithmetic function module $f_3$ for calculating the degree of subcooling, taking into consideration the saturation temperature. The current degree of subcooling from the module $f_3$ is then fed via a signal line $SL_3$ to the PID module $PID_3$. For the last step of the multistep control circuit, the module $PID_3$ determines a further set-point value for the flow volume of the feedwater into the HP evaporator 4. This set-point value is fed via the signal line $SW_4$ to a fourth and last PID module $PID_4$ of the PID modules which are connected in series. A measuring device $M_4$ in the line 14 establishes the existing flow volume, the measured value signal of which is fed via a signal line $SL_4$ to the PID module $PID_4$. The module $PID_4$, taking into consideration predetermined minimum and maximum values for the flow volume, then generates a control signal which is directed via a control signal line RL to a valve 12 in the supply line 14 to the HP evaporator.

The valve opening is then correspondingly activated. As a result, an optimum feed water supply into the HP evaporator for the desired steam temperature in the steam turbine DT is ensured. The valve 12, which is controlled by means of the control circuit, can be arranged at any point in the feedwater supply line into the high-pressure evaporator, i.e. for example at the inlet to the high-pressure evaporator and downstream of the high-pressure economizer or else in the line upstream of the inlet into the high-pressure economizer.

A simplified variant of the control circuit is identical to the circuit from FIG. 1 with the exception of the control module $PID_4$ and the measuring device for measuring the feedwater flow volume. The variant has only three series-connected control modules and a control signal line which leads from the control module $PID_3$ directly to the valve 12. As previously mentioned, instead of PID control modules state controllers with monitors can be also be used both in this circuit and in the circuit from FIG. 1.

In each control step, i.e. in each PID module, the set-point value for the following control step is generated in each case, wherein these are determined taking into consideration specified minimum and maximum set-point values. When generating the set-point value for the degree of superheating of the steam at the outlet of the high-pressure evaporator 4, which is transmitted via line $SW_2$, a range for the set-point value is established by means of a lower limit Min Sh and an upper limit Max Sh. This range ensures the optimum and reliable operation of the steam generator.

The lower limit Min Sh prevents a saturation state (water-steam mixture) at the outlet of the high-pressure evaporator. A saturation state at the outlet of the high-pressure evaporator would otherwise lead to an impairment of the evaporation process and to an unstoppable overheating at the outlet of the superheater of the steam generator.

The upper limit Max Sh prevents an exceeding of the steam temperature beyond the permissible material temperature at the outlet of the high-pressure evaporator. It additionally ensures that overheating at the outlet of the high-pressure evaporator does not exceed the required limit for a stable operation of the evaporator.

In a similar way, by means of PID module $PID_2$ the set-point value for the degree of subcooling of the feedwater at the inlet into the HP evaporator 4 is determined within a range which is specified by a lower limit Min Sc and an upper limit Max Sc. The lower limit Min Sc prevents steaming out of the feedwater at the inlet of the high-pressure evaporator and therefore ensures the operational stability of the high-pressure evaporator and prevents closing of the valves at the inlet of the high-pressure evaporator. The upper limit Max Sc prevents an excessively high degree of subcooling and therefore an unstable operation of the evaporator far from the optimum operating range. In particular, this upper limit Max Sh ensures a suitable reaction time of the control system, i.e. a quicker return to an optimum operating range.

Similarly, by means of PID module $PID_3$ the set-point value for the flow volume of the feedwater into the HP evaporator 4 is generated within a range between Min $F_1$ and Max $F_1$. The lower limit ensures that a minimum flow is ensured, for example in the event of a valve malfunction. The upper limit ensures a flow volume below the maximum possible feedwater-pump flow volume.

In a further embodiment of the method according to the embodiment, the set-point value for the live steam temperature for the steam turbine and the measured steam temperature at the outlet from the superheater 3 is used for generating a control signal for the opening of a valve 16 in a make-up water line 15. This make-up water is then injected into the superheater 3. For this, the set-point value for the live steam temperature for the steam turbine, which is specified by means of the device 13, is fed via a line SW5 to a further PID control module PID5. Moreover, the temperature measured value from the measuring device M1 is also fed to the PID module PID5 via a line SL1'. This module PID5 generates the control signal for the opening position of a valve 16 in a line 15 for make-up water for injecting into the steam superheater 3. This make-up water is especially necessary when running up the plant if the hot exhaust gases from the gas turbine have not yet reached the HP economizer and HP evaporator and if there is no steam in the superheater.

The control signal for the opening of the valve 16 is additionally used for generating a maximum set-point value Max Sh for the degree of superheating at the outlet from the high-pressure evaporator 4. The valve control signal from the PID control module PID5 is fed to a further PID module PID6 for this purpose. Based on this valve signal, this generates the maximum degree of superheating Max Sh so that as the valve opening increases, i.e. as make-up water volume increases, the upper limit Max Sh in the first step of the multistep control system of the steam generator is lowered. Lowering the set-point value for the degree of superheating is for the purpose of increasing the feedwater flow volume for the high-pressure evaporator. As a result, excessive injection of make-up water while running up the plant is prevented. This maximum value Max Sh for the set-point value of the degree of superheating is increased or reduced in order to regulate the sensitivity of the control module PID1. In the event that the difference between measured and set-point values for the steam temperature at the outlet from the superheater is equal to zero, an adjustment of the set-point value for the degree of superheating is enabled by means of the signal from the control module PID5.

Instead of the circuit for injection by means of control modules PID5, PID6, the signal lines SW5, SL1', the water line 15 and the valve 16, the injection of make-up water can also be realized by means of a so-called exit stage injection with line 18 and valve 17 and control modules and signal lines which are associated therewith. Moreover, the two injection circuits can also be used at the same time.

Figure 2:
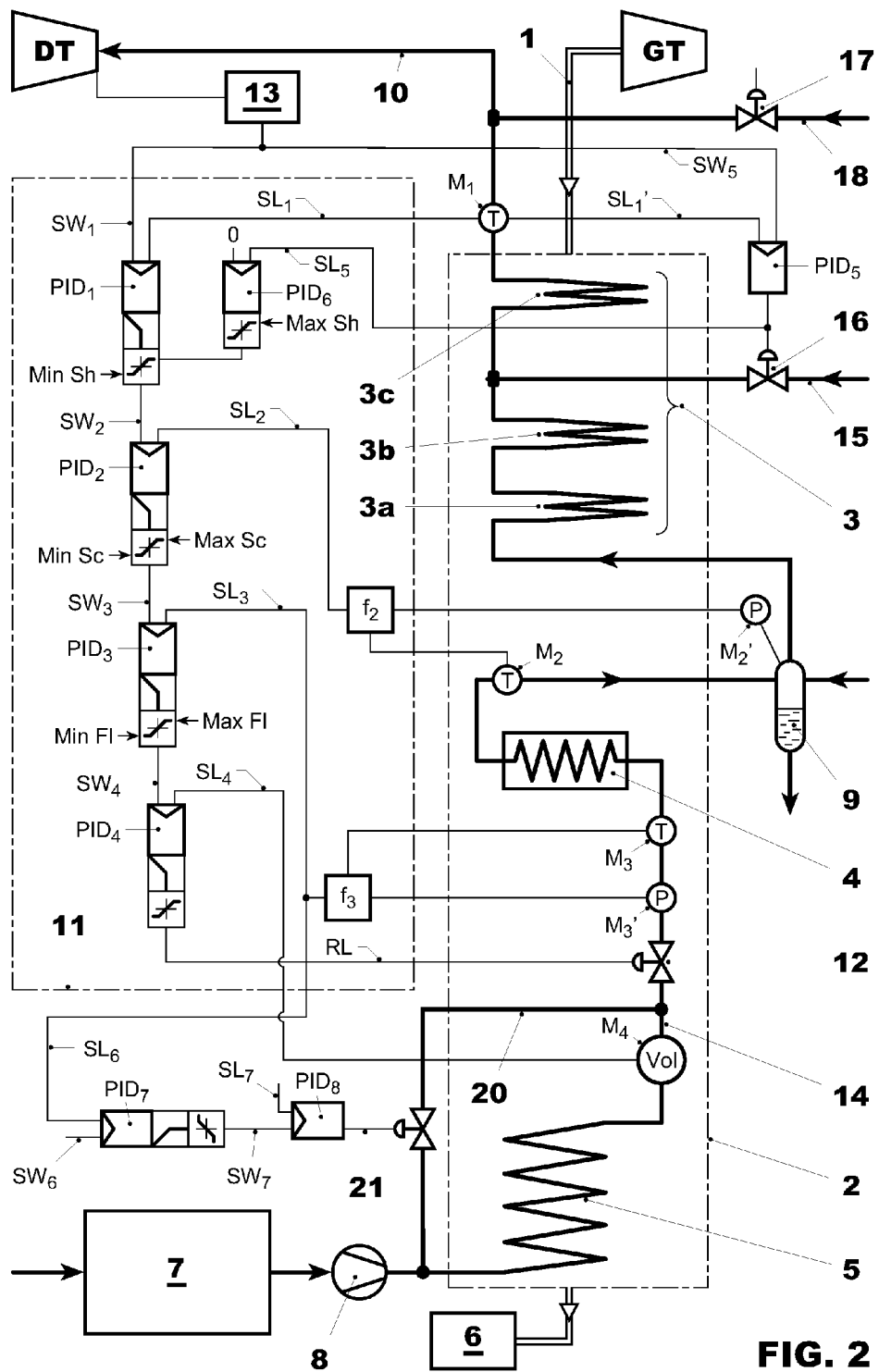
FIG. 2 shows a schematic representation of an exhaust gas steam generator as in FIG. 1 with a control circuit for controlling the steam generator according to the fourth embodiment of the circuit.

FIG. 2 schematically shows the same combined cycle power plant with once-through steam generator as in FIG. 1 and the same control circuit for controlling this plant as in FIG. 1, but with additional elements for controlling the subcooling of the flow medium at the inlet of the high-pressure evaporator. The plant additionally has a bypass line 20 which branches from the outlet from the feedwater pump 8 and leads into the feedwater line 14 of the once-through steam generator upstream of the inlet into the high-pressure evaporator 4 and downstream of the economizer 5.

FIG. 2 shows the additional circuit elements according to the fourth embodiment of the control circuit. In particular, a control module $PID_7$ is shown, to which lead a signal line $SL_6$ and a signal line $SW_6$ which transmit to the control module $PID_7$ a current degree of subcooling of the flow medium at the inlet to the high-pressure evaporator 4 according to calculation by means of the arithmetic function module $f_3$ or by means of a minimum set-point value for the degree of subcooling. The minimum set-point value of the degree of subcooling is especially smaller than the minimum set-point value for the degree of subcooling which is transmitted to the control module $PID_3$ via line $SW_3$. The module $PID_7$, based on the difference between the current degree of subcooling which is fed to it and the minimum set-point value for the degree of subcooling, determines a set-point value for the flow volume through the bypass line 20. A signal line $SW_7$ leads from the module $PID_7$ to a further control module $PID_8$, to which the determined flow volume set-point value is fed. A signal line $SL_7$ also leads to this control module $PID_8$, via which a current value of the flow volume through the bypass line 20 is transmitted to the said module $PID_8$. On account of the small pressure difference, this current value of the flow volume, instead of by measurement for example by computer, is determined by means of an energy balance calculation:

$$m_{eco\text{-}byp} = m_{eva}(h_{eco} - h_{mix})/(h_{eco} - h_{fdw\text{-}pmp}),$$

wherein
$m_{eco\text{-}byp}$ represents the mass flow through the bypass line 20,
$m_{eva}$ represents the mass flow through the high-pressure evaporator 4,
$h_{eco}$ represents the enthalpy of the flow medium in the economizer 5,
$h_{mix}$ represents the enthalpy of the flow medium in the line downstream of the entry of the bypass line 20,
$h_{fdw\text{-}pmp}$ represents the enthalpy of the flow medium in the feedwater pump 8.

Based on the set-point value for the flow medium and also on the calculated current flow volume $m_{eco\text{-}byp}$, $PID_8$ generates a control signal for the opening position of a valve in the bypass line 20. The valve control signal is finally transmitted by means of a signal line 21 from the module $PID_8$ to the valve in the bypass line 20.

A simplified variant of the control circuit is identical to the circuit from FIG. 2 with the exception of the control module $PID_8$ and the signal line for the current value of the flow volume through the bypass line. In the variant, a control signal line leads directly from the module $PID_7$ to the valve in the bypass line 20.

As previously mentioned, instead of PID control modules state controllers with monitors can also be used both in this circuit and in the circuit from FIG. 2.

LIST OF DESIGNATIONS

GT Gas turbine
DT Steam turbine
1 Exhaust gas line
2 Exhaust gas steam generator, waste heat recovery steam generator
3 High-pressure superheater
3a, b, c Stages of the high-pressure superheater 3
4 High-pressure steam generator
5 High-pressure economizer
6 Smoke stack
7 Feedwater tank
8 Feedwater pump
9 Separator
10 Live steam line
11 Control circuit
12 Valve
13 Device for the input of a set-point value for the turbine steam temperature
14 Feedwater supply line
15 Make-up water line
16 Valve
17 Valve
18 Make-up water line
20 Bypass line
21 Signal line to valve in bypass line 20
M1, M2, M3, M4; M2', M3' Measuring devices 1-5
SW1, SW2, SW3, SW4, SW5, S6 Lines for transmitting set-point values
SL1-6 Signal lines
RL Control signal line
PID1-8 Proportional-integrator-differentiator control modules
f2, f3 Calculation modules

What is claimed is:

1. A method for controlling a steam generator of a once-through steam generator type, which is integrated in a combined cycle power plant with a steam turbine and a gas turbine, the steam generator comprising a high pressure economizer, a high pressure evaporator, and at least one superheater, wherein opening of a valve for regulating flow volume in a feedwater supply line into the high-pressure evaporator is controlled in dependence upon a temperature set-point value for steam for the steam turbine and also upon a measured steam temperature at the outlet of the at least one superheater and by means of a plurality of control steps in series, wherein the measured steam temperature at the outlet of the superheater, a degree of superheating in consideration of a prevailing saturation temperature at the outlet of the high-pressure evaporator and a degree of subcooling of the feedwater in consideration of a prevailing saturation temperature at the inlet into the high-pressure evaporator are integrated in the control steps, wherein the method comprises the steps:

measuring steam temperature at the outlet of the superheater, in a first control step, comparing the steam temperature at the outlet of the superheater with a set-point value for turbine steam temperature at the outlet of the superheater according to an operating state of the steam turbine, and generating a set-point value for the degree of superheating at the outlet of the high-pressure evaporator based on the difference between the measured value and the set-point value of the steam temperature at the outlet of the superheater, measuring the current degree of superheating at the outlet of the high-pressure evaporator, in a second control step, generating a set-point value for the degree of subcooling of the feedwater at the inlet of the high-pressure evaporator based on the difference between the set-point value and current measured value of the degree of superheating at the outlet of the high-pressure evaporator, measuring the current degree of subcooling of the feedwater at the inlet into the high-pressure evaporator, in a third control step, generating a set-point value for the flow volume for the feedwater upstream of the high-pressure evaporator based on the difference between the set-point value and the current measured value for the degree of subcooling of the feedwater at the inlet into the high-pressure evaporator, based on the set-point value for the flow volume of the feedwater, generating a control signal for the opening of a valve in the feedwater supply line and transmitting the control signal to the valve, wherein the set-point value for the degree of superheating at the outlet of the high-pressure evaporator is determined between a maximum value (Max Sh) and a minimum value (Min Sh), said maximum value (Max Sh) being a value established to prevent an exceeding of the steam temperature beyond a permissible material temperature at the outlet of the high pressure evaporator and said minimum value (Min Sh) being a value established to prevent a saturation state at the outlet of the high-pressure evaporator.

2. The method as claimed in claim 1, wherein after determining the set-point value for the flow volume of the feedwater, these steps are additionally carried out:

measuring the current flow volume of the feedwater into the high-pressure evaporator, in a fourth control step, generating a control signal for an opening position of the valve in a feedwater supply line upstream of the high-pressure evaporator based on the difference between the set-point value for the flow volume of the feedwater and the current measured flow volume, transmitting a control signal for the opening of the valve in the feedwater supply line.

3. The method as claimed in claim 1, wherein the set-point value for the degree of subcooling of the feedwater at the inlet into the high-pressure evaporator is determined between specified maximum and minimum values (Max Sc, Min Sc), said maximum value (Max Sc) being a value established to avoid unstable operation of the high-pressure evaporator and said minimum value (Min Sc) being a value established to prevent steaming out of the feedwater at the inlet of the high-pressure evaporator.

4. The method as claimed in claim 3, wherein the set-point value for the flow volume is determined between specified maximum and minimum values (Max Fl, Min Fl), said maximum value (Max Fl) being a value established to ensure a flow volume below a maximum possible feedwater flow volume and said minimum value (Min Fl) being a value established to ensure the flow volume does not exceed a predetermined minimum flow volume.

5. The method as claimed in claim 1, wherein these steps are additionally carried out:

determining a set-point flow volume through a bypass line between the outlet of a feedwater pump of the combined cycle power plant and the inlet of the high-pressure evaporator based on the difference between the current measured value of the degree of subcooling at the inlet of the high-pressure evaporator and a minimum set-point value for the subcooling which is smaller than the set-point value for the subcooling in the third control step;

based on the set-point value for the flow volume through the bypass line, generating and transmitting a control signal for an opening position of a valve in the bypass line.

6. The method as claimed in claim 5, wherein the method additionally comprises the steps:

determining the current flow volume in the bypass line;

generating a control signal for the opening position of a valve in the bypass line, based on the set-point value for the flow volume through the bypass line and a current flow volume through the bypass line;

transmitting the control signal for a position of the valve in the bypass line.

\* \* \* \* \*